May 27, 1969  R. GREENBERG  3,446,388
CRYOGENIC TANK SUPPORT MEANS
Filed April 15, 1966
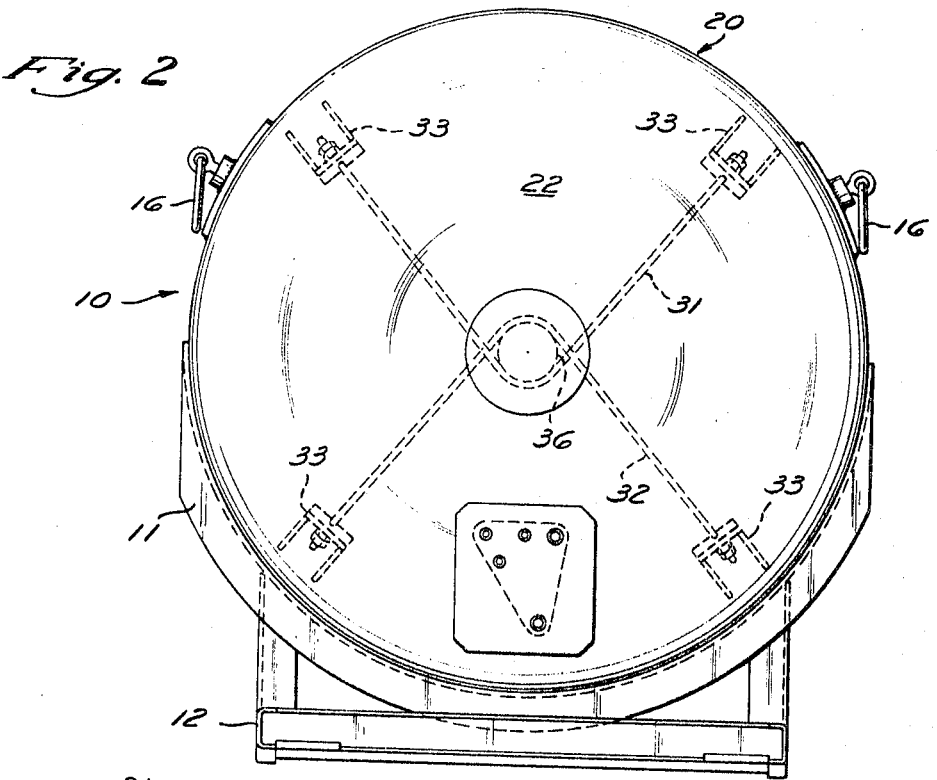
Fig. 2
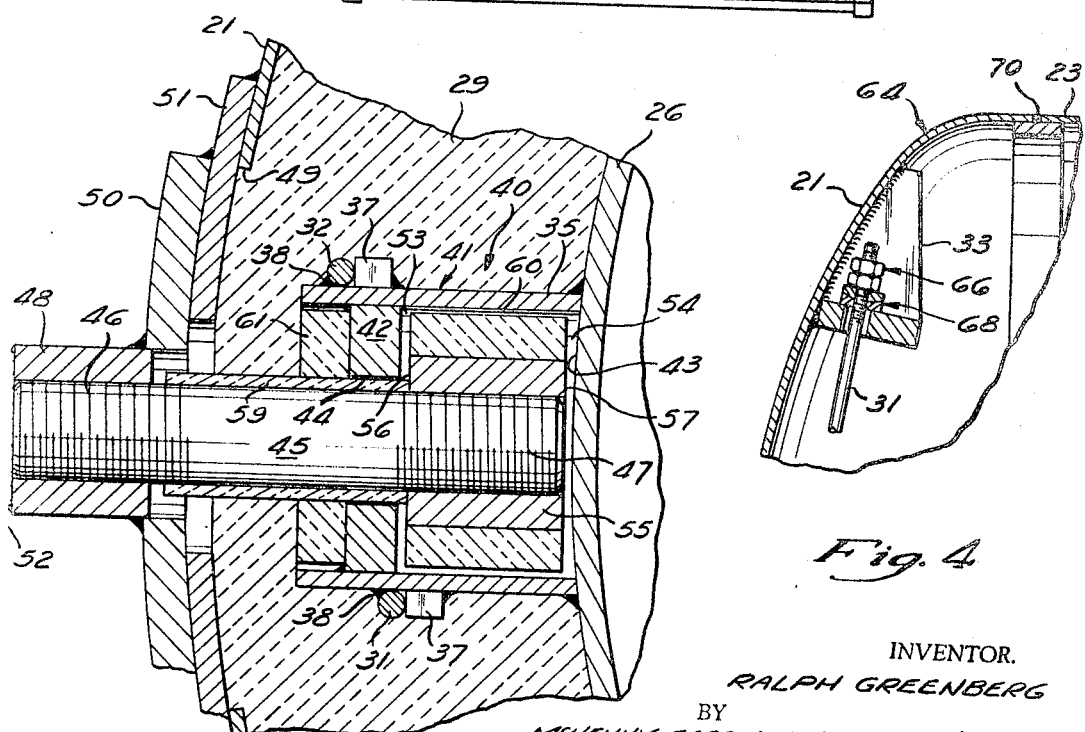
Fig. 3
Fig. 4
INVENTOR.
RALPH GREENBERG
BY
McNENNY, FARRINGTON, PEARNE & GORDON
ATTORNEYS

United States Patent Office 3,446,388
Patented May 27, 1969

3,446,388
CRYOGENIC TANK SUPPORT MEANS
Ralph Greenberg, University Heights, Ohio, assignor to Ryan Industries, Inc., a corporation of Ohio
Filed Apr. 15, 1966, Ser. No. 542,884
Int. Cl. B65d 81/02
U.S. Cl. 220—15
8 Claims

ABSTRACT OF THE DISCLOSURE

A suspension arrangement for a transportable Dewar-type container having an inner vessel disposed within and spaced from an outer vessel. A strut is secured to one vessel and cooperates with abutment means secured to the other vessel so that relative movement of the vessels with respect to each other is limited in two directions along a path in which the vessels are translated together. The strut and abutment means are separated from one another to provide a break in the solid thermal conduction path between the vessels and engage each other in load-bearing relationship for loads acting in either direction on the path during both positive and negative acceleration of said container.

---

This invention relates generally to transportable thermally insulated containers and more particularly to Dewar-type containers for cryogenic fluids.

In cryogenic containers of the Dewar-type, an inner vessel is supported within an outer vessel by a suspension system capable of restraining relative movement of the inner vessel in all directions when the container is subjected to external forces. For the most efficient operation of the container it is desirable that a minimum amount of heat be conducted from the outer vessel to the inner vessel through the inner vessel suspension system.

The inner vessel suspension systems heretofore employed for this purpose have provided relatively large solid thermal conduction paths between the vessels and, therefore, have not been wholly satisfactory. Prior efforts to reduce the amount of heat conducted between the inner and outer vessels by making the support members from synthetic plastic materials have not always been successful because a deterioration of the vacuum in the evacuated space between the two vessels may occur when the plastic members are subjected to abrasion or friction which causes a breakdown of the plastic structure with a resultant generation of gas.

Heretofore it has been a practice to suspend the inner vessel within the outer vessel by a plurality of radially extending tension rods. In such systems the outer ends of the tension rods have been attached to structural support rings secured to the cylindrical portion of the outer vessel. The use of such additional structural members was found to be necessary because the cylindrical portion of the outer vessel lacked sufficient strength to withstand the loads imposed upon the tension rods.

The present invention overcomes the above disadvantages by providing a new and improved suspension system for the inner vessel. In the present invention a single interrupted end strut assembly rigidly supports the inner vessel against relative movement whenever the container is subjected to either positive or negative acceleration loads along an axis in the direction of travel yet establishes a solid thermal conduction path between the vessels only for as long as the container is subjected to the acceleration loads.

The present invention also provides a novel arrangement by which the inner vessel support rods are attached directly to the outer vessel thus eliminating the need for additional structural support rings. This is accomplished by securing the ends of the rods to the outer vessel in the areas of greatest curvature thereby utilizing the increased strength available in these areas.

It is an important object of the present invention to provide an improved transportable thermally insulated container.

Another important object of the present invention is to provide a Dewar-type thermally insulated container having an inner vessel that is strongly supported against positive and negative acceleration loads by means which is structurally sturdy but involves only minimal heat inleak.

Another object of the present invention is to provide an improved support system for the inner vessel of the Dewar-type cryogenic container.

Additional features and advantages of the present invention will readily become apparent upon an examination of the drawings and the following detailed description of the preferred embodiment of the present invention.

In the drawings:

FIGURE 2 is a partial end view showing the inner vessel support rods in phantom;

FIGURE 3 is a cross section of the end strut arrangement; and,

FIGURE 4 is a fragmentary cross-sectional view of the inner vessel support rod mounting arrangement;

Figure 1:
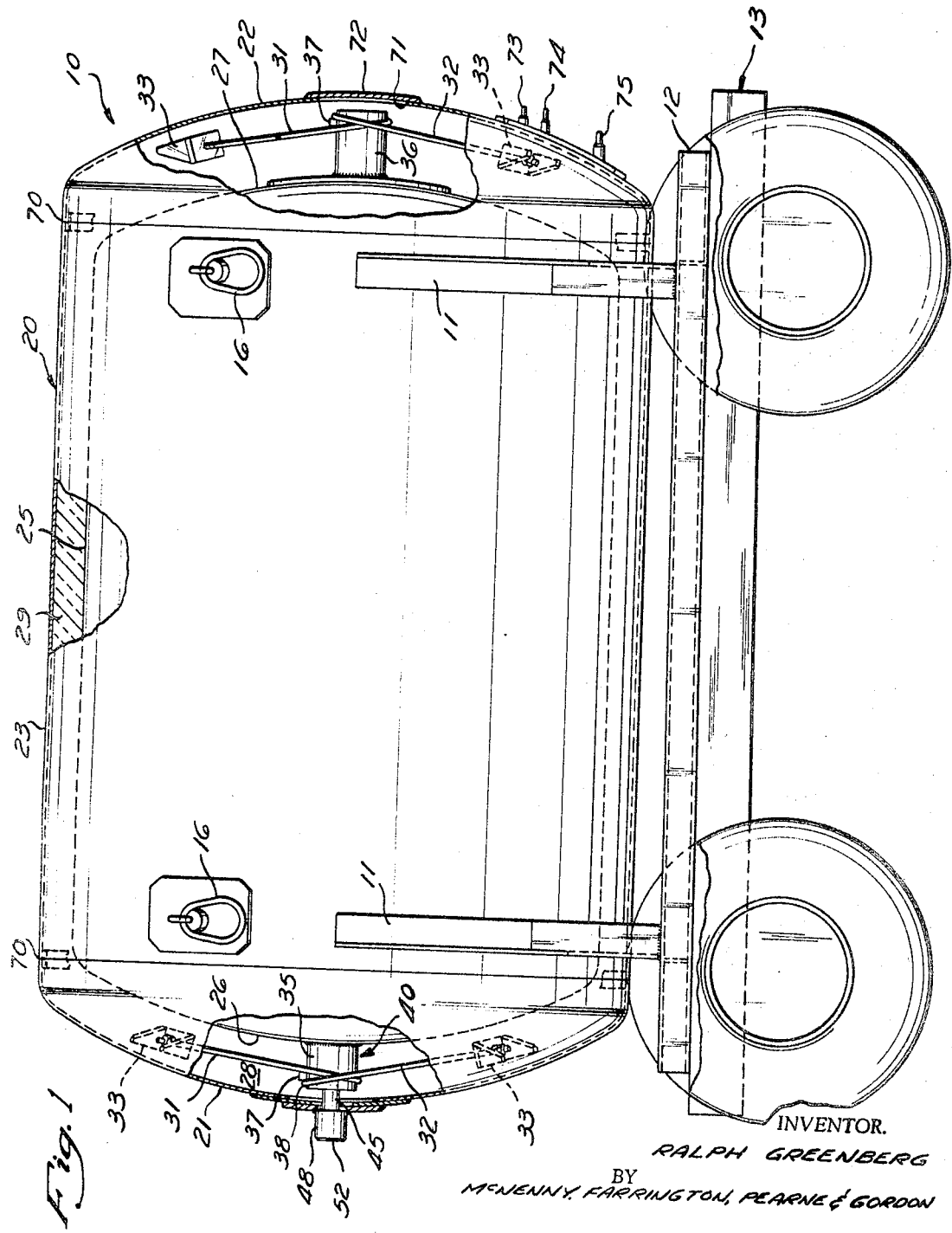
FIGURE 1 is an elevatioanl view, partially cut away, of a trailer mounted container embodying the principles of the present invention.

Referring to the drawings in greater detail, FIGURE 1 shows a storage container generally indicated by the reference numeral 10 supported within the cradles 11 of a skid 12. The skid 12 is mounted upon a rubber tired trailer 13. To facilitate the handling of the container, four lifting or tie-down rings 16 are provided on its exterior.

The container comprises a vacuum-tight cylindrical outer vessel 20 having a pair of rounded convex head portions 21 and 22 and a cylindrical portion 23. Centrally suspended within the outer vessel 20 is a vacuum-tight cylindrical inner vessel 25 also having rounded head portions 26 and 27. The vessels 20 and 25 are separated from one another by a space 28. To insure the proper thermal insulation of the inner vessel 25, the space 28 may be wholly or partly filled with an insulating material 29 and evacuated by a vacuum pump.

Relative lateral and vertical movement of the inner and outer vessels is prevented by four substantially V-shaped upper and lower support or tension rods 31 and 32, respectively, which also suspend the inner vessel within the outer vessel. To reduce thermal conduction between the inner and outer vessels, the rods 31 and 32 are made of materials such as certain stainless steels or other alloys which are characterized by high strength and low thermal conductivity while remaining ductile at cryogenic temperatures. The ends of the V-shaped rods 31 and 32 are secured to the outer vessel 20 by means of support brackets 33 on the head portions 21 and 22. The center portions of the rods 31 and 32 loop about cylindrical front and back trunnions 35 and 36 projecting from the head portions 26 and 27 of the inner vessel. The rods 31 and 32 are positioned axially in one direction on the trunnions by blocks 37 and in the other direction by welds 38.

An important feature of the invention is the single end strut assembly 40 which limits relative longitudinal movement of the vessels in both fore and aft directions when the container is subjected to longitudinal loads during both positive and negative acceleration.

Referring to FIGURE 3, the end strut assembly 40 includes a housing or abutment means 41, the longitudinal portion of which is formed by the front trunnion 35. The housing 41 includes an outer end wall 42 having an opening 44 therethrough secured to the inner surface of the trunnion 35 and an inner wall 43 formed by a portion of the head 26 of the inner vessel 25.

Extending between the inner and outer vessels is a strut 45 which may be either a rod or a tube. The strut 45 has a diameter less than the opening 44 and is of a high strength low thermal conductivity material such as epoxy-fiber glass laminates or the like. See the fiber reinforced plastics mentioned in Cryogenic Data Handbook AD 609562 (August 1964), Clearing House for Federal Scientific and Technical Information, 5285 Port Royal Road, Springfield, Va. 22151, pages H.1.b to H.5.r inclusive. Such materials are generally characterized by having a heat conductivity that, to an order of magnitude, is substantially lower than that of metals, and may generally be about $\frac{1}{30}$ to $\frac{1}{40}$ or about 3% that of metal such as steel.

The strut 45 is threaded on both ends at 46 and 47 and the outer end of the strut 45 is rigidly secured to the head portion 21 of the outer vessel 20 through an end nut 48. The end nut 48 is welded to a first plate 50 which is welded to a larger second plate 51 which in turn is welded to the head 21 sealing the opening 49 to insure a vacuum-tight joint between the end nut 48 and the end strut 45. An end plate 52 seals the end of the nut 48.

The inner end of the end strut 45 slidably passes through the opening 44 and is also provided with an end nut 55 having an outside diameter greater than the opening 44. As illustrated, the end nut 55 is of metal. The axial distance between the two end walls 42 and 43 of the housing 41 slightly exceeds the axial length of the nut 55. This difference in lengths provides a small gap between the end nut and the housing.

Without a cryogenic fluid in the inner vessel, the inner end 57 of the end nut 55 abuts or almost abuts the inner wall 43. However, when the inner vessel is cooled by being filled with a cryogenic fluid, the inner vessel contracts (but remains yieldingly centered on the hanger rods 31) leaving roughly equal gaps 53 and 54 between the inner and outer ends of the nut 55 and the inner and outer walls of the housing. These relatively small gaps provide a break in the solid thermal conduction path between the inner and outer vessels and minimize the heat inleak to the inner vessel.

Upon imposition of an external accelerating force and acceleration of the container to the left in FIGURES 1 and 3, a reactive force to the right is imposed on the inner vessel, causing a slight lost motion as the gap 53 is closed. When the gap does close, the outer end 56 of the nut 55 abuts the outer wall 42 of the housing to thereby support the inner vessel against the reactive force by limiting the movement of the inner vessel relative to the outer vessel. When the acceleration ends, the inner vessel recenters itself on the hanger rods 31 and reopens the gap 53. Similarly, upon deceleration of the container, the inner end 57 of the nut 55 temporarily closes the gap 54 and abuts the inner wall 43 of the housing 41.

In this manner, rigid support is provided between the two vessels when it is needed to resist temporary fore and aft longitudinal loads and is eliminated when not needed in order to minimize the heat inleak to the inner vessel. It is to be noted that this temporary structural support is provided through an interface (the interface 42, 56 or the interface 43, 57) rather than through solidly attached parts, and this fact contributes to inhibition of heat inleak even during actual support.

In the illustrated end strut assembly 40, only metallic elements 42, 43, and 55 move into and out of engagement with one another to take the temporary longitudinal loads. Therefore, there is no abrasion of the plastic members to generate gases which may deleteriously affect the insulating vacuum in the evacuated space 28.

To minimize the tendency for the threads 46 and 47 on the plastic strut 45 to shear off under load, the nuts 48 and 55 have a length-to-internal diameter ratio greater than 1.3 as compared with standard nuts which have a length-to-internal diameter ratio of from less than 1 to slightly greater than 1. It has been found in threaded plastic struts that when the length-to-internal diameter ratio is less than 1.3, the threads tend to fail before the strut.

To further insulate the strut assembly, the strut 45 and the end nut 55 are wrapped with an insulating material as shown at 59 and 60, respectively. Similarly, the area at the outer end of the outer wall 42 is also filled with an insulating material as shown at 61.

Another important feature of the invention lies in the mounting arrangement for the lateral support rods 31 and 32. Since the outer vessel is designed to withstand external pressures because of the evacuated space between the two vessels, its walls do not have a sufficient section modulus to withstand the tensile forces exerted by the loads imposed upon the internal vessel hanger rods. Heretofore it has been the practice to use an otherwise unduly heavy outer vessel, or to mount the support brackets on additional supporting rings made from structural angles or shapes secured to the cylindrical portion of the outer vessel or to resort to like expedients. The present mounting arrangement eliminates the need for extra weight or these extra supporting rings or other expedients.

As shown in FIGURE 4, the support brackets 33 are welded directly to the convex head portion 21 adjacent the sharply curving portion 64. Since the section modulus of the outer vessel 20 increases in the area of greatest curvature, the structural strength of the outer vessel also increases in this area. Therefore, by placing the brackets 33 at or close to the area of greatest curvature, applicant utilizes the increased strength in ths area for supporting the inner vessel 25.

The rods 31 and 32 are secured to the bracket 33 by a lock nut assembly 66 and a spherical washer assembly 68. The spherical washer assembly 68 allows the rods to accommodate movement or misalignment by pivoting at their ends rather than bending.

Another feature of the present invention lies in the simplified method of assembling the container made possible by attaching the lateral support rods 31 and 32 directly to the head portions 21 and 22 of the outer vessel. The head portions are placed upon assembly jigs and the rods 31 and 32 preassembled, mounted and adjusted within the head portions about trunnion pilots on the assembly jigs similar to the trunnions on the head portions. The jigs are then removed from the head portions.

Head portion 22 is then welded to the cylindrical portion 23 of the outer vessel at 70. The trunnion 36 of the inner vessel 25 is positioned within the preassembled and adjusted center portions of the rods 31 and 32 until the rods engage the blocks 37. A welder then reaches through the opening 71 in the head portion 22 and welds the rods to the trunnions at 38. The opening 71 is then sealed by a plate 72.

Head portion 21 is similarly fitted to the other end of the cylindrical portion 23 and the rods welded to the trunnion 35 by the welder reaching through the opening 49. The opening 49 is then closed by the plates 50 and 51. The end strut assembly 40 is then checked for the proper total gap by moving the strut 45 in and out of the housing 41. The nut 48 is then welded and sealed to the plate 50 with the end 57 of the nut 55 in engagement with the inner wall 43 of the housing so that when the inner vessel contracts after being filled the proper gaps 53 and 54 will exist between the nut 55 and the housing 41.

Figure 5:
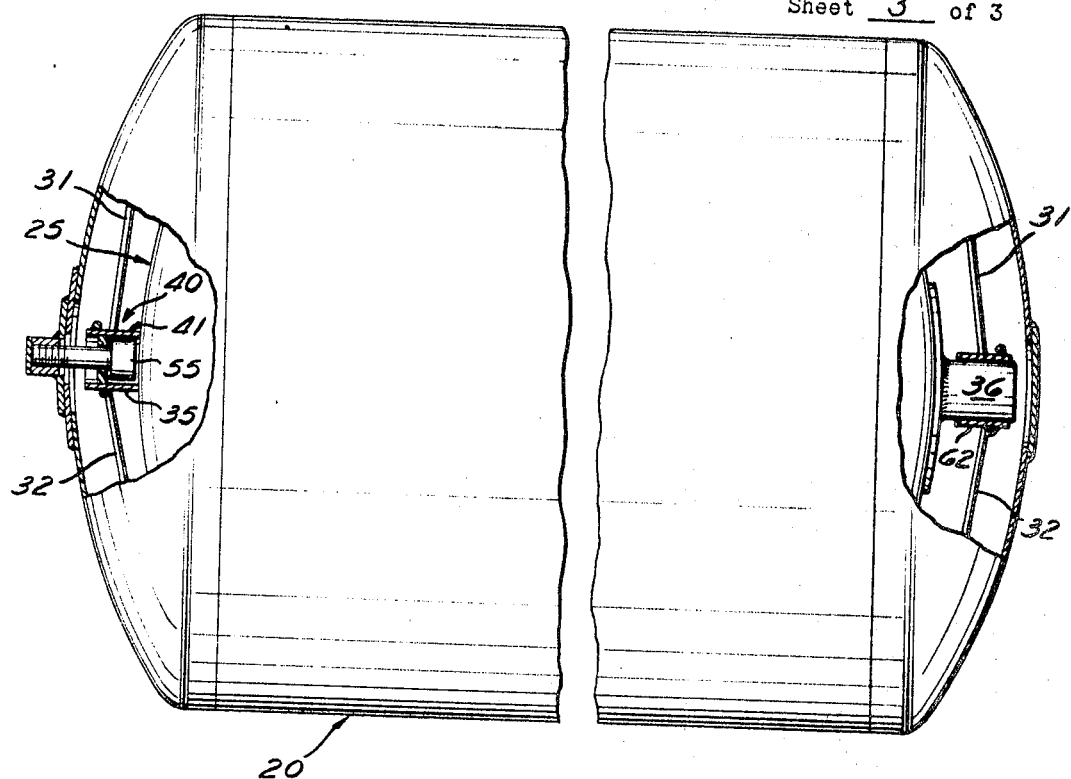
FIGURE 5 illustrates an alternative embodiment of the invention.

With the suspension arrangement illustrated in FIGURE 1, the end nut 55 is centered within the housing 41 by the contraction of the inner vessel 25 when it is filled and first brought to low temperature. However, with long containers this may not always be the best arrangement, for as the length of the inner vessel increases, the axial length of the gap required to accommodate the contraction of the inner vessel also increases, with a resultant increase in lost motion and impact loads. But in order to minimize the impact loads resulting from the lost motion of the end nut 55 within the end strut assembly 40, it is desirable that the axial gaps 53 and 54 be kept as small as possible. FIGURE 5 illustrates an alternative arrangement which accomplishes this even in the case of containers having substantial length.

In FIGURE 5 there is shown the same front trunnion mount and end strut assembly as illustrated in FIGURE 3. There is further provided a slip ring assembly 62 surrounding the back trunnion 36. The slip ring assembly 62 has sufficient internal diameter and axial length to permit the back trunnion 36 to slide freely within it without twisting or gouging. So that substantially no axial forces are exerted upon the right hand end of the vessel the hanger rods 31 and 32 are secured directly to the slip ring 62 rather than to the back trunnion 36. The relative effect of this mounting arrangement is to allow substantially all of the axial contraction of the inner vessel 25 relative to the outer vessel 20 to occur within the slip ring assembly 62 rather than within the end strut assembly 40. The end nut is maintained in a centered position within the housing 41 during initial cooling because the associated rods 31 and 32 can (in view of the slippage at the trunnion 36) maintain a fixed position by the front trunnion 35 relative to the outer vessel 20.

In operational use after positive or negative acceleration and impact by the end nut 55, the nut is recentered within the housing 41 by the axial forces generated by the yielding action of the preset rods 31 and 32 associated with the front trunnion 35. Since the initial centering of the end nut 55 is independent of the axial contraction of the inner vessel 25, the axial gap in the end strut assembly need be only large enough to provide an interruption in the solid thermal conduction path between the inner and outer vessels.

While conduits 73, 74, and 75 are shown emerging from the outer vessel 20, the apparatus for supplying cryogenic fluid to and removing it from the container forms no part of the present invention and, therefore, has not been shown in detail. As is conventional, such conduits may be provided with bends and long runs between the inner and outer vessels, so as to permit the inner vessel to remain centered when it contracts, and to increase resistance to heat inleak.

The invention is not restricted to the slavish imitation of each and every one of the details described above which have been set forth merely by way of example with the intent of most clearly setting forth the teaching of the invention. Obviously, devices may be provided which change, eliminate or add certain specific structural details without departing from the invention.

What is claimed is:

1. In a suspension system for a transportable Dewar-type container having an inner vessel disposed within and spaced from an outer vessel, means disposed between said vessels for limiting translational movement of said vessels with respect to each other along a path on which they are translated together, said means comprising strut means of a material having a high strength-to-thermal conductivity ratio as compared to metal secured to one end of one of said vessels and extending from said one end in the direction of said path, housing means, said housing means defining a pair of spaced abutment means in said path secured to the same end of the other of said vessels and adapted to abut an enlarged portion on said strut and limit relative movement of said vessels with respect to each other in either direction on the path of translation, said enlarged portion being disposed between the abutment means of said housing, said housing means and its abutment means being completely spaced a substantial distance from all parts of said strut means to provide a break in the solid thermal conduction path between said vessels, said strut and abutment means engaging each other in load-bearing relationship for loads acting in either direction on the path during both positive and negative acceleration of said container.

2. A portable thermally insulated container comprising an outer vessel, an inner vessel smaller than the outer vessel, means centrally and coaxially suspending the inner vessel within the outer vessel with the entire inner vessel being spaced from the outer vessel, means extending between the vessels to limit the relative movement of the inner vessel with respect to the outer vessel during positive or negative acceleration in the direction of the common axis of the vessels, said limiting means including a housing secured to one end wall of one of said vessels, said housing together with said vessel end wall defining an enclosed cavity and having a pair of opposed end walls one of which has an opening therethrough, strut means of a material having a high strength-to-thermal conductivity ratio as compared to metal having one end secured to the same end of the other of said vessels, the free end of said strut means being axially slidably received within said opening but spaced from the peripheral edges thereof and having an enlarged end portion disposed within said cavity, said enlarged end portion having a radial dimension greater than that of said opening but less than that of the cavity and an axial dimension less than that of said cavity, said end portion being normally completely spaced from said housing by a break in the solid thermal conduction path between the vessels whereby the slight axial movement of the inner vessel relative to the outer vessel in either axial direction of travel causes the end portion of said strut means to abut one of said housing end walls to provide a rigid load bearing support between the inner and outer vessels.

3. A device as set forth in claim 2 wherein the enlarged end of said strut means comprises an internally threaded member threaded to said strut means and having a length-to-internal diameter ratio of substantially 1.3.

4. A device as set forth in claim 2 wherein said suspending means comprises rods disposed with their axes extending radially with respect to the container.

5. A device as set forth in claim 2 wherein an axially extending trunnion is provided on one end of said inner vessel opposite the end upon which the limiting means is mounted, and elements of said suspending means support said one end of said inner vessel through said housing and other elements of said suspending means support the other end of said inner vessel through said axially extending trunnion.

6. A device as set forth in claim 5 wherein a slip ring assembly is provided surrounding said axially extending trunnion and the associated elements of said suspension means support said inner vessel through said slip ring, said slip ring and said axially extending trunnion being so constructed and arranged as to allow said trunnion to slide freely within said slip ring.

7. A container comprising an outer vessel in the form of a cylinder joined to rounded end portions whose curvatures are highest at or near their junctures with the cylinder, an inner vessel smaller than the outer vessel, rod means suspending the inner vessel within the outer vessel with the outer vessel spaced from the inner vessel, mounting means connecting said suspending means to the rounded end portions of outer vessel at or near said highest curvatures of said end portions, said mounting means including spherical socket means permitting pivotal movement of the ends of the rod means mounted thereby.

8. A device as set forth in claim 7 wherein said inner vessel is provided with end trunnion means and said suspending means support said inner vessel through said trunnion means.

(References on following page)

References Cited

UNITED STATES PATENTS

| | | | |
|---|---|---|---|
| 2,184,336 | 12/1939 | Devine | 220—15 X |
| 2,256,673 | 9/1941 | Hansen | 220—15 |
| 2,900,800 | 8/1959 | Loveday | 220—10 X |
| 2,925,934 | 2/1960 | Hampton et al. | 220—15 |
| 2,992,622 | 7/1961 | Maker | 220—15 X |
| 3,037,657 | 6/1962 | Hampton et al. | 220—15 |
| 3,163,313 | 12/1964 | Reynolds et al. | 220—15 |
| 3,208,622 | 9/1965 | Trentham et al. | 220—15 |
| 3,331,525 | 7/1967 | Coehn | 220—15 |
| 1,607,071 | 11/1926 | Gleason | 220—15 |
| 2,823,822 | 2/1958 | Altman | 220—15 |
| 2,858,136 | 10/1958 | Rind | 220—15 X |
| 2,874,865 | 2/1959 | Canty et al. | 220—15 |
| 3,191,795 | 6/1965 | Molnar | 220—14 |
| 3,339,782 | 9/1967 | Segura et al | 220—15 |

JOSEPH R. LECLAIR, *Primary Examiner.*

JAMES R. GARRETT, *Assistant Examiner.*